UNITED STATES PATENT OFFICE.

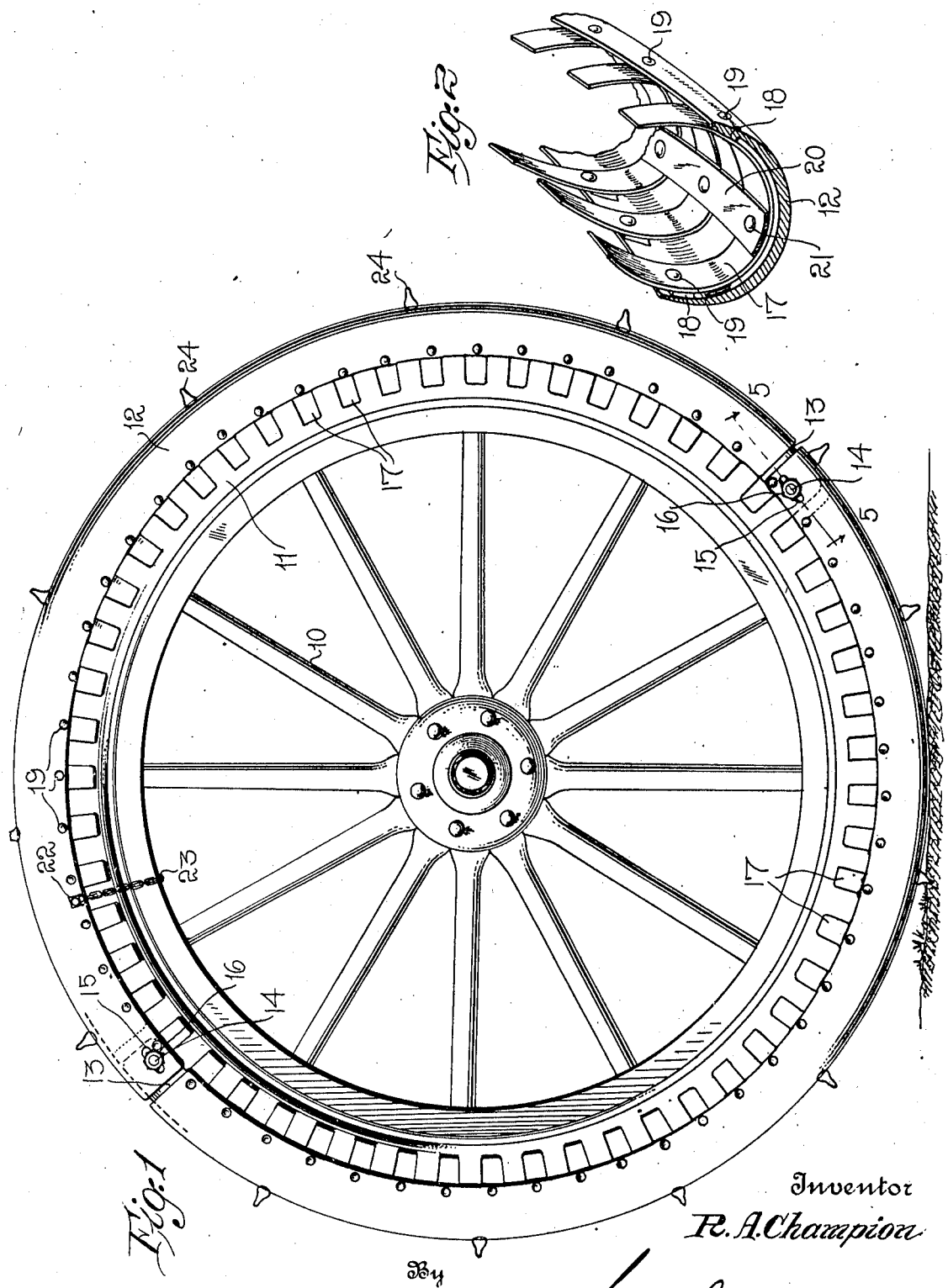

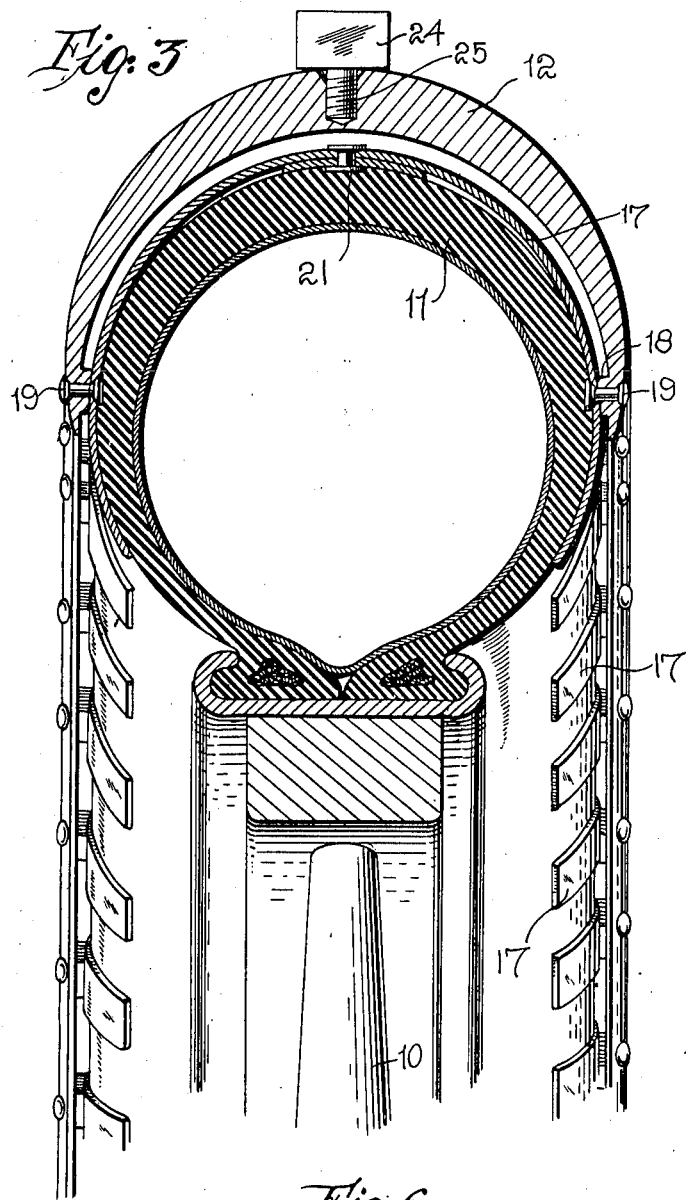
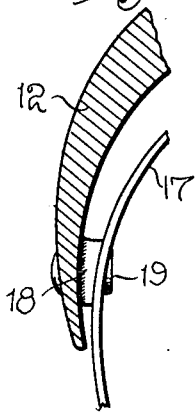
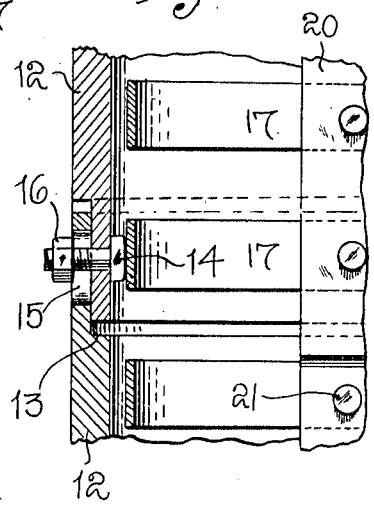
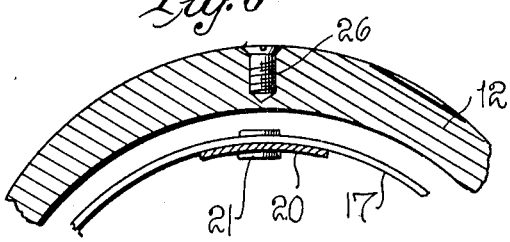

ROADY A. CHAMPION, OF DENISON, IOWA.

TIRE-ARMOR.

1,314,946.   Specification of Letters Patent.   Patented Sept. 2, 1919.

Application filed December 2, 1918. Serial No. 265,057.

*To all whom it may concern:*

Be it known that I, ROADY A. CHAMPION, citizen of the United States, residing at Denison, in the county of Crawford and State of Iowa, have invented certain new and useful Improvements in Tire-Armor, of which the following is a specification.

This invention relates to an improved tire armor and has as its primary object to provide a device of this character which may be readily applied to substantially any conventional type of motor vehicle tire for effectually protecting the tire against wear or abrasion.

The invention has as a further object to provide an armor so constructed that when applied, anti-skid calks may be connected to the armor for preventing slipping or skidding.

The invention has as a still further object to provide an armor employing an outer shoe adapted to encircle the tire and wherein resilient clamping members will be employed for engagement with the tire to firmly connect the shoe therewith.

And the invention has as a still further object to provide a construction wherein the shoe will be supported in spaced relation to the outer surface of the tire so as to permit of the escape of dirt or other foreign matter from the shoe and prevent grinding of the tire.

Other and incidental objects will appear during the course of the detailed description of the invention. In the drawings, wherein I have illustrated the preferred embodiment of the invention, and wherein similar reference characters designate corresponding parts throughout the several views:

Figure 1 is a side elevation showing my improved armor in connection with a conventional type of vehicle wheel and tire, Fig. 2 is a fragmentary perspective view particularly showing the construction and mounting of the attaching clamps of the device, Fig. 3 is a fragmentary transverse sectional view particularly illustrating the manner in which the shoe of the armor is supported in spaced relation to the outer surface of the tire, Fig. 4 is a fragmentary sectional view showing the spacing blocks carried by the shoe for supporting the attaching clamps upon the shoe, Fig. 5 is a fragmentary sectional view taken on the line 5—5 of Fig. 1 and looking in the direction of the arrows, this view showing the type of connection employed between the ends of the sections of the shoe, and Fig. 6 is a fragmentary sectional view illustrating the screw plugs employed for closing the anti-skid calk sockets in the shoe when the calks are displaced.

Referring now more particularly to the drawings, I have shown my improved tire armor in connection with a conventional type of motor vehicle wheel 10 upon which is mounted a pneumatic tire 11 of ordinary construction. In carrying the invention into effect I employ an armor shoe 12 adapted, as particularly shown in Fig. 1, to encircle the tire 11. This armor shoe is preferably formed of mating substantially semi-circular sections provided at their ends with lapped joints 13. Removably fitted through opposite sides of one of the sections at these joints, in the manner shown in detail in Fig. 5, are short bolts 14 which project through suitable slots 15 in the ends of the other section and at their outer terminals receive nuts 16 so that the bolts thus slidably and detachably connect the sections. Movement of one section relative to the other will be permitted, incident to flexing movement of the tire. The sections of the shoe are rigid and are preferably formed of suitable metal, the said sections being substantially concavo convex to fit around the tread of the tire extending well down over the sides thereof. At their side margins, the sections are preferably feathered, as particularly brought out in Fig. 3, while the intermediate portions of the sections are thickened so as to present a strong and durable tread surface at the tread of the shoe.

Mounted within each of the shoe sections is a series of clamping members 17. These clamping members are each preferably formed from a strip of suitable resilient sheet metal and are supported upon the shoe sections at the side margins thereof by spacer blocks 18. As shown in detail in Fig. 4, the blocks are preferably formed integral with the sections of the shoe to project inwardly therefrom and the inner face of the blocks are curved so that the end portions of the clamping members seat flat thereagainst. Connecting the clamping members with said blocks are rivets or other suitable fastening devices 19 extending through the members, the blocks and the side margins of the sections. It is now to be noted, as particularly shown in Fig. 3, that the blocks 18 support the clamping members spaced throughout their length from the inner faces of the shoe sections and connecting the series of members upon each section is a resilient tie strip 20. These tie strips are disposed midway of the ends of the members at the inner sides thereof to extend circumferentially of the shoe sections and are rigidly connected with the members by a plurality of rivets or other suitable fastening devices 21. Thus, it will be seen that the clamping members upon each section of the shoe will be rigidly supported with respect to each other to snugly fit, as shown in Fig. 3, around the outer surface of the tire 11, the tie strips encircling the tire at its tread so as to provide a continuous bearing surface therefor. At their ends, the tie strips 20 lap joint as shown in detail in Fig. 5.

Particular attention is now directed to the fact that the clamping members 17 project well beyond the spacing blocks 18 radially inward with respect to the shoe and the end portions of these members are thus free to resiliently engage around the sides of the tire for firmly clamping the shoe thereto. The shoe will thus be effectually held against lateral displacement while, at the same time, by displacing the bolts 14, the shoe sections may be readily removed. Furthermore, attention is directed to the fact, as also shown in Fig. 3, that the clamping members will support the shoe in spaced relation to the outer face of the tire. Consequently, dirt or other foreign matter gathered up by the shoe may escape therefrom so that grinding of the surface of the tire from this cause will be eliminated. Furthermore, rubbing of the surface of the tire by the shoe will also be eliminated.

Removably connected to opposite sides of one of the sections of the shoe, preferably adjacent one end of said section, are bolts 22 and engaged at its ends with these bolts is a chain 23 which, as shown in Fig. 1, extends around the felly of the wheel 10. This chain will not only prevent accidental loss of the shoe in case of injury to the wheel but will also prevent possible creeping of the shoe.

In order to overcome slipping or skidding, I provide anti-skid calks 24 in connection with the shoe. These calks are arranged at suitable circumferentially spaced points about the tread of the shoe and are provided with shanks 25 threaded into suitable sockets or openings in said tread. When it is not desired to use the calks screw plugs 26 are, as shown in Fig. 6, provided for closing the calk sockets.

It will, therefore, be seen that I provide a particularly effective construction for the purpose set forth and a tire armor which will not only protect the tire against wear but will also, when passing over icy or rough roadways, protect the tire against abrasion while, at the same time, skidding may be easily avoided by employing the anti-skid calks provided.

The shoe and attaching clamps will, of course, be constructed to fit practically all sizes and shapes of automobile tires so as to adapt the device for general use.

Having thus described the invention, what is claimed as new is:

1. A tire armor including an armor shoe, spacer blocks carried thereby, and arcuate clamping members supported by said blocks spaced from the inner face of the shoe and adapted to engage around a tire for connecting the shoe therewith.

2. A tire armor including an armor shoe, spaced clamping members fitted within the shoe to extend transversely thereof and supported in spaced relation to the inner face of the shoe, and means connecting the intermediate portions of said clamping members with each other, the clamping members being adapted to engage around a tire for connecting the shoe therewith and holding said connecting means to contact with the tread portion of the tire.

3. A tire armor including an annular armor shoe, resilient tire engaging members fitted therein, and means spacing said members from the inner face of said shoe whereby the members will support the shoe to surround a tire spaced from the outer face of the tire.

4. A tire armor including an annular armor shoe, resilient tire engaging members fitted therein, means carried by the shoe and spacing said members from the shoe whereby the members will support the shoe to surround a tire spaced from the outer face of the tire, and means connecting the members with said first mentioned means.

5. A tire armor including an annular armor shoe arcuate in cross section, arcuate tire engaging members fitted within the shoe and of less radius than the cross sectional radius of the shoe, means projecting from the side margins of the shoe and supporting the intermediate portions of the members spaced from the inner face of the shoe, means extending through the members and connecting said first mentioned means and connecting the members with the shoe, and means secured to and connecting the intermediate portions of said members with each other.

In testimony whereof I affix my signature.

ROADY A. CHAMPION. [L. S.]